United States Patent
Masuda et al.

(10) Patent No.: US 10,096,426 B2
(45) Date of Patent: Oct. 9, 2018

(54) ELECTRONIC DEVICE

(71) Applicant: TDK CORPORATION, Tokyo (JP)

(72) Inventors: Sunao Masuda, Tokyo (JP); Katsumi Kobayashi, Tokyo (JP); Masahiro Mori, Tokyo (JP); Kayou Matsunaga, Nikaho (JP); Norihisa Ando, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/391,312

(22) Filed: Dec. 27, 2016

(65) Prior Publication Data

US 2017/0186539 A1 Jun. 29, 2017

(30) Foreign Application Priority Data

Dec. 28, 2015 (JP) ................. 2015-257379

(51) Int. Cl.
*H01G 4/248* (2006.01)
*H01G 2/06* (2006.01)
*H01G 4/232* (2006.01)
*H01G 4/30* (2006.01)
*H01G 4/12* (2006.01)

(52) U.S. Cl.
CPC .............. *H01G 4/248* (2013.01); *H01G 2/06* (2013.01); *H01G 4/232* (2013.01); *H01G 4/2325* (2013.01); *H01G 4/30* (2013.01); *H01G 4/12* (2013.01)

(58) Field of Classification Search
None
See application file for complete search history.

(56) References Cited

U.S. PATENT DOCUMENTS

| 6,191,933 | B1* | 2/2001 | Ishigaki | H01G 4/232 |
| | | | | 361/309 |
| 6,288,887 | B1 | 9/2001 | Yoshida et al. | |
| 8,134,825 | B2* | 3/2012 | Otsuka | H01G 2/065 |
| | | | | 361/306.3 |
| 9,355,775 | B2* | 5/2016 | Itagaki | H01G 2/065 |
| 9,633,790 | B1* | 4/2017 | Kim | H01G 4/30 |
| 9,820,383 | B2* | 11/2017 | Park | H05K 1/181 |
| 2009/0296311 | A1* | 12/2009 | Otsuka | H01G 2/065 |
| | | | | 361/306.3 |
| 2012/0043854 | A1* | 2/2012 | Otsuka | H01G 2/065 |
| | | | | 310/311 |

(Continued)

FOREIGN PATENT DOCUMENTS

JP 2000-235932 A 8/2000

*Primary Examiner* — Dion R Ferguson
(74) *Attorney, Agent, or Firm* — Oliff PLC (57) ABSTRACT

An electronic device includes a chip component with a terminal electrode formed on an end surface of a ceramic element body including an internal electrode and an external terminal electrically connected to the terminal electrode. The external terminal includes a terminal electrode connection part arranged to face the terminal electrode and a mounting connection part connectable to a mounting surface. The terminal electrode connection part includes a multilayer structure of a first metal connected to the terminal electrode, a second metal arranged outside the first metal, and a third metal arranged outside the second metal. A thermal expansion coefficient of the external terminal is smaller than that of the ceramic element body.

7 Claims, 6 Drawing Sheets

(56) References Cited

U.S. PATENT DOCUMENTS

| | | | |
|---|---|---|---|
| 2015/0114702 A1* | 4/2015 | Lee | H01G 2/065 174/260 |
| 2015/0114704 A1* | 4/2015 | Park | H01G 2/065 174/260 |
| 2015/0243438 A1* | 8/2015 | Ahn | H01G 4/012 174/258 |
| 2017/0062133 A1* | 3/2017 | Lee | H01G 4/30 |
| 2017/0127522 A1* | 5/2017 | Park | H05K 1/181 |
| 2017/0208691 A1* | 7/2017 | Masunari | H01G 4/005 |

* cited by examiner

ELECTRONIC DEVICE

BACKGROUND OF THE INVENTION

1. Field of the Invention

The present invention relates to an electronic device to which external terminals consisting of metal terminals are connected, for example.

2. Description of the Related Art

In addition to an ordinary chip component directly surface-mounted on a board or so by itself, a chip component to which an external terminal such as a metal terminal is attached is proposed as an electronic device having a ceramic element body such as a ceramic capacitor. It is reported that an electronic device to which an external terminal is attached relaxes a deformation stress that a chip component receives from a board and has an effect of protecting the chip component from impact or so after the electronic device is mounted. The electronic devices are used in fields requiring durability, reliability, and the like.

In the electronic device with the external terminal, one end of the external terminal is connected to a terminal electrode of the chip component, and the other end is connected to a mounting surface such as a circuit board by solder or so. For example, Patent Document 1 discloses that a metal such as copper and copper alloy is used as the external terminal for reducing an electronic resistance.

When a metal such as copper and copper alloy is used as the external terminal, however, a stress is generated at a solder part after the external terminal is connected to a terminal electrode of a ceramic element body by solder or so, because the metal has a thermal expansion coefficient larger than that of the ceramic element body. Thus, there are problems that a strength at a connection part between the terminal electrode of the ceramic element body and the external terminal is decreased, reliability such as thermal shock resistance deteriorates, and the like.

Patent Document 1: JP 2000-235932 A

SUMMARY OF THE INVENTION

The prevent invention has been achieved under such circumstances. It is an object of the invention to provide an electronic device capable of reducing a stress at a connection part of an external terminal.

To achieve the above object, the electronic device according to a first aspect of the present invention is an electronic device including:

a chip component with a terminal electrode formed on an end surface of a ceramic element body including an internal electrode; and an external terminal electrically connected to the terminal electrode, wherein the external terminal includes:

a terminal electrode connection part arranged to face the terminal electrode; and a mounting connection part connectable to a mounting surface, the terminal electrode connection part includes a multi-layer structure of a first metal connected to the terminal electrode, a second metal arranged outside the first metal, and a third metal arranged outside the second metal, and a thermal expansion coefficient of the external terminal is smaller than that of the ceramic element body.

In the electronic device according to the first aspect of the present invention, the thermal expansion coefficient of the external terminal having the multilayer structure of the first metal, the second metal, and the third metal is configured to be smaller than that of the ceramic element body. The present inventors have employed this configuration and thus found out that a stress at a connection part of the external terminal (for example, a solder connection part) can be reduced. Then, the present invention has been achieved. The stress reduction improves a strength at a connection part between the terminal electrode of the ceramic element body and the external terminal, and also improves reliability such as thermal shock resistance.

Preferably, a thermal expansion coefficient of the first metal by itself is larger than that of the ceramic element body, a thermal expansion coefficient of the second metal by itself is smaller than that of the ceramic element body, and a thermal expansion coefficient of the third metal by itself is larger than that of the ceramic element body. The first metal and the third metal having a larger thermal expansion coefficient than that of the ceramic element body normally have a low electric resistance, and can improve an equivalent series resistance (ESR) of the electric component.

Preferably, a constitution ratio of the second metal in the external terminal is 40% or more. This configuration allows the external terminal to have a smaller thermal expansion coefficient than that of the ceramic element body while improvement effect of the ESR is maintained.

A thermal expansion coefficient of the first metal by itself may be smaller than that of the ceramic element body, a thermal expansion coefficient of the second metal by itself may be larger than that of the ceramic element body, and a thermal expansion coefficient of the third metal by itself may be smaller than that of the ceramic element body. The second metal having a larger thermal expansion coefficient than that of the ceramic element body normally has a low electric resistance, and can improve an equivalent series resistance (ESR) of the electric component. When the first metal connected to the terminal electrode is constituted by a metal having a small thermal expansion coefficient, a reduction effect of a stress at a connection part (for example, a solder connection part) is particularly large.

In the above case, a constitution ratio of the second metal in the external terminal is preferably 50% or less. This configuration makes it possible to have a large improvement effect of the ESR while the thermal expansion effect of the external terminal is configured to be in a smaller range than a thermal expansion effect of the ceramic element body.

To achieve the above object, the electronic device according to a second aspect of the present invention is an electronic device including:

a chip component with a terminal electrode formed on an end surface of a ceramic element body including an internal electrode; and an external terminal electrically connected to the terminal electrode, wherein the external terminal includes:

a terminal electrode connection part arranged to face the terminal electrode; and a mounting connection part connectable to a mounting surface, the terminal electrode connection part includes a multi-layer structure of a first metal connected to the terminal electrode and a second metal arranged outside the first metal, and a thermal expansion coefficient of the external terminal is smaller than that of the ceramic element body.

In the electronic device according to the second aspect of the present invention, the thermal expansion coefficient of the external terminal having the multilayer structure of the first metal and the second metal is configured to be smaller than that of the ceramic element body. The present inventors have employed this configuration and found out that a stress at a connection part of the external terminal (for example, a solder connection part) can be reduced. Then, the present invention has been achieved. The stress reduction improves a strength at a connection part between the terminal electrode of the ceramic element body and the external terminal, and also improves reliability such as thermal shock resistance.

Incidentally, the present invention conceptually uses the term of a metal including an alloy.

DESCRIPTION OF THE PREFERRED EMBODIMENTS

Hereinafter, the present invention will be described based on embodiments shown in the figures.

First Embodiment

Figure 1A:
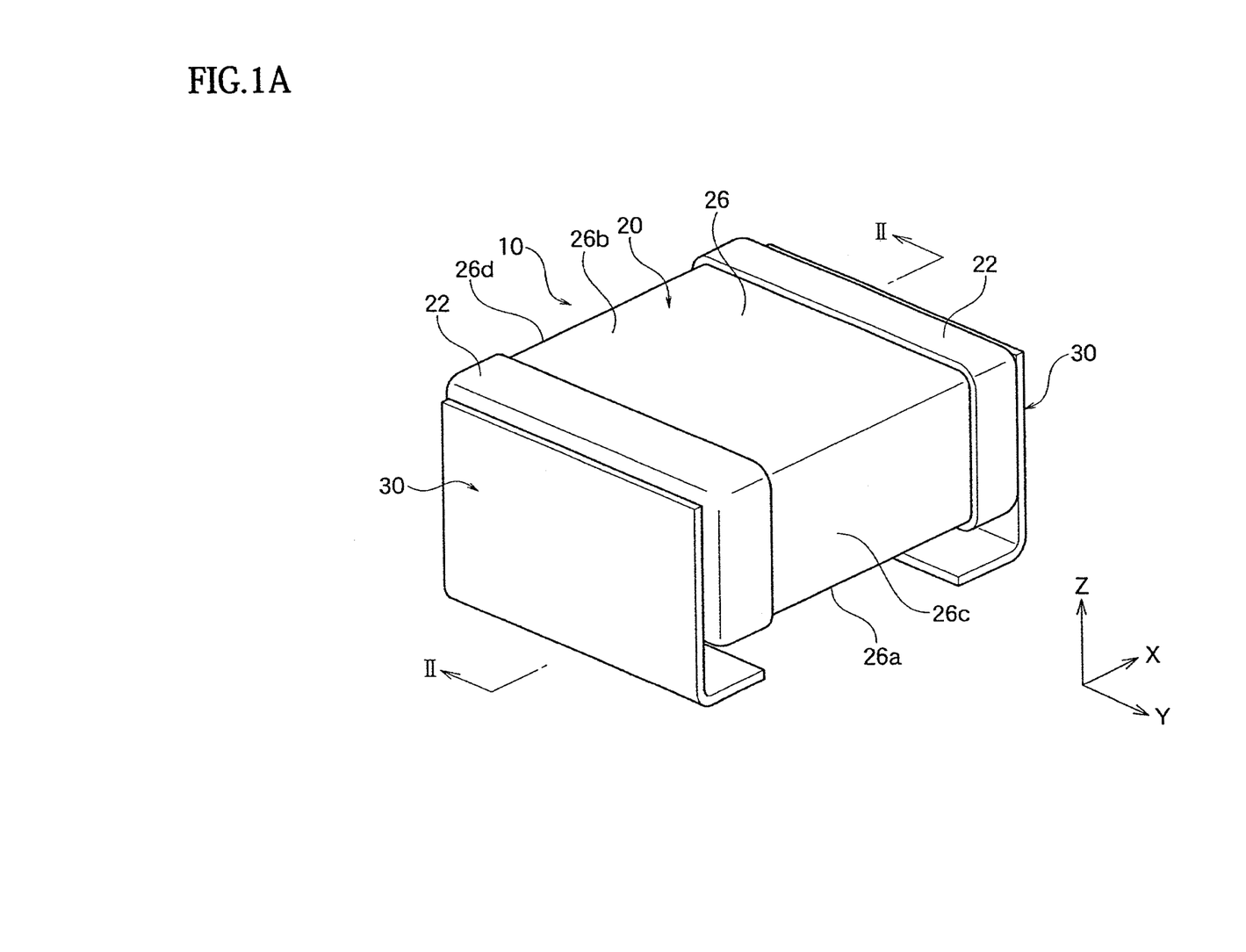
FIG. 1A is a perspective view of an electronic device according to an embodiment of the present invention.

FIG. 1A is a schematically cross sectional view showing an electronic device 10 according to First Embodiment of the present invention. The electronic device 10 has a chip capacitor 20 as a chip component and a pair of metal terminals (external terminals) 30 respectively attached on both end surfaces in the X-axis direction of the chip capacitor 20.

Incidentally, each embodiment will be explained based on an electronic device where a pair of the metal terminals 30 is attached on the chip capacitor 20, but a ceramic electronic device of the present invention is not limited to the electronic device, and may be an electronic device where the metal terminals 30 are attached to a chip component other than a capacitor.

Figure 2:
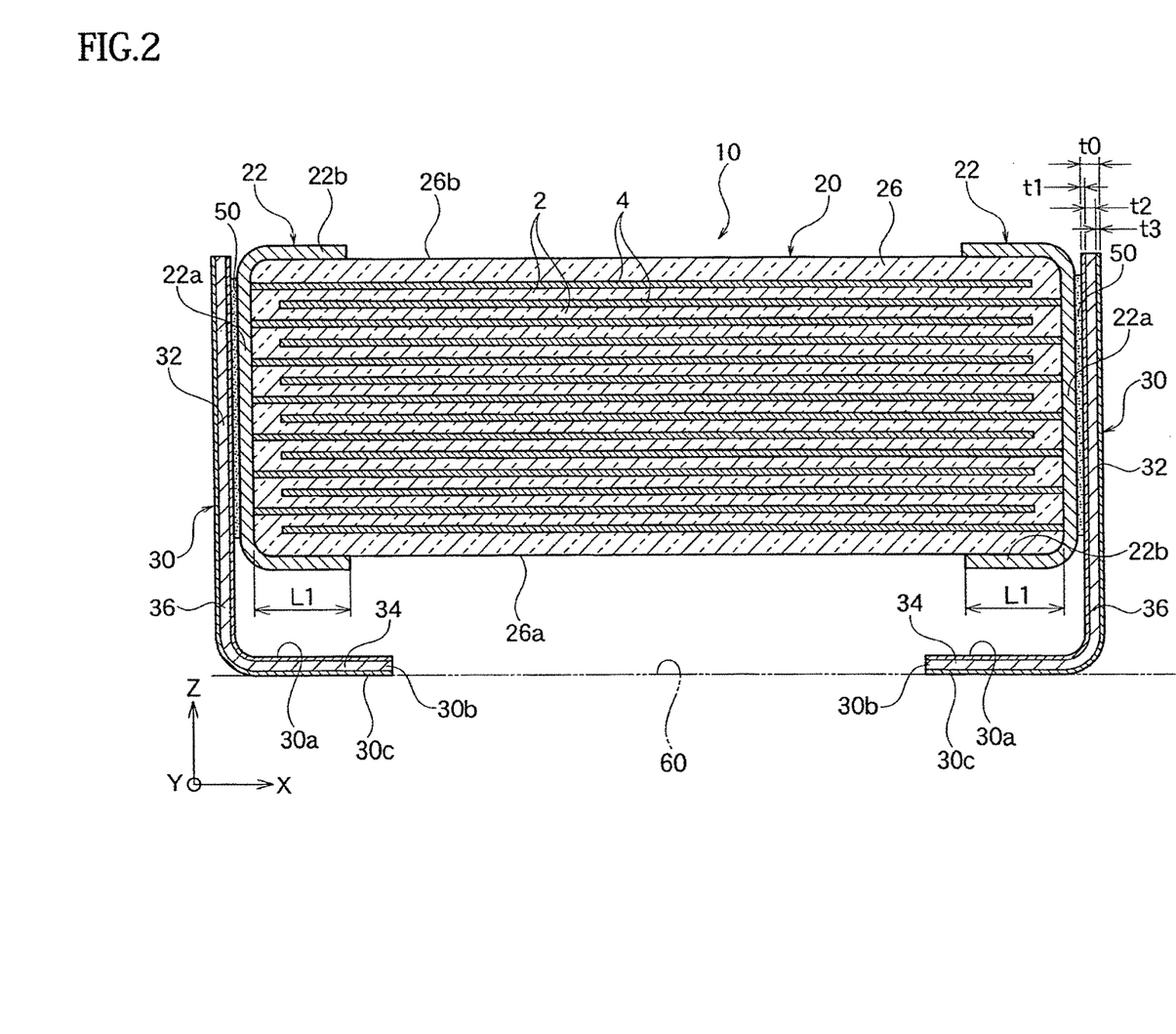
FIG. 2 is a cross sectional view taken along the II-II line of the electronic device shown in FIG. 1A.

The chip capacitor 20 has a capacitor element body (ceramic element body) 26 and a pair of terminal electrodes 22 respectively formed on both end surfaces in the X-axis direction of the capacitor element body 26. The capacitor element body 26 has four side surfaces 26a, 26b, 26c, and 26d, all of which are approximately vertical to the end surfaces in the X-axis direction. As shown in FIG. 2, the side surface 26a of the side surfaces is a bottom side surface closest to a mounting surface 60 of a circuit board. In the present embodiment, the side surface 26b opposing to the bottom side surface 26a in parallel is a top side surface. The other side surfaces 26c and 26d are arranged approximately vertically to the mounting surface 60.

In the respective drawings, the X-axis, the Y-axis, and the Z-axis are vertical to each other, and the Z-axis is a vertical direction to the mounting surface 60, the X-axis is a vertical direction to the end surfaces of the element body 26, and the Y-axis is a vertical direction to the side surfaces 26c and 26d.

As shown in FIG. 2, the capacitor element body 26 has dielectric layers 2 as ceramic layers and internal electrode layers 4 therein, and the dielectric layers 2 and the internal electrode layers 4 are alternately laminated. One of adjacent internal electrode layers 4 is connected to one of the terminal electrodes 22 opposing to each other in the X-axis direction. Incidentally, FIG. 2 shows that the dielectric layers 2 and the internal electrode layers 4 are alternately laminated along the Z-axis direction, but the dielectric layers 2 and the internal electrode layers 4 may be alternately laminated along the Y-axis direction. The lamination direction is not limited.

The dielectric layer 2 is made by any materials, and is constituted by dielectric materials such as calcium titanate, strontium titanate, barium titanate, and mixture of these. Each of the dielectric layers 2 has any thickness, but normally has a thickness of one tenth of several μm to tens of μm.

The conductor material contained in the internal electrode layer is not limited, and a comparatively cheap base metal can be used if the constituent material of the dielectric layer has a reduction resistance. The base material is preferably Ni or a Ni alloy. The Ni alloy is preferably an alloy of Ni and one or more elements selected from Mn, Cr, Co, and Al, and the Ni is preferably contained at 95 wt % or more in the alloy. Incidentally, various kinds of fine components, such as P, may be contained at about 0.1 wt % or less in the Ni or the Ni alloy. The internal electrode layers may be formed using a commercially available electrode paste. The thicknesses of the internal electrodes are appropriately determined depending upon usage or so.

The terminal electrodes 22 are also made by any materials, and is normally made by copper, copper alloy, nickel, nickel alloy, or the like, but may be also made by silver, an alloy of silver and palladium, or the like. The thickness of the terminal electrode 22 is not limited either, but is normally about 10 to 50 μm. Incidentally, at least one kind of a metal coating film selected from Ni, Cu, Sn etc. may be formed on the surfaces of the terminal electrodes 22. In particular, the metal film is preferably a multilayer structure of Cu baked layer/Ni plating layer/Sn plating layer.

In the present embodiment, the terminal electrodes 22 may be constituted by multilayer electrode films having at least a resin electrode layer. The terminal electrodes 22 having a resin electrode layer is preferably composed of baked layer/resin electrode layer/Ni plating layer/Sn plating layer from the contacting side against the element body 26, for example.

As shown in FIG. 2, the terminal electrodes 22 have end surface electrode parts 22a and side surface electrode parts 22b. The end surface electrode parts 22a are positioned respectively on both end surfaces in the X-axis direction of the element body 26 so as to cover the end surfaces. The side surface electrode parts 22b are formed integrally with the end surface electrode parts 22a so as to cover from the end surfaces of the element body 26 to a plurality of the side surfaces 26a to 26d near the end surfaces with a predetermined covering width L1. In the present embodiment, the side surface electrode parts 22b may not substantially be formed, and the terminal electrodes 22 may be substantially constituted by only the end surface electrode parts 22a.

As shown in FIG. 1A and FIG. 2, each of the metal terminals 30 has a terminal electrode connection part 32 and a mounting connection part 34. The terminal electrode connection part 32 is arranged to face the end surface electrode part 22a of the terminal electrode 22 formed on the end surface in the X-axis direction of the element body 26. The mounting connection part 34 is connectable to the mounting surface 60. As shown in FIG. 2, the terminal electrode connection part 32 and the mounting connection part 34 are linked by a link part 36 formed integrally with them so that the bottom side surface 26a of the element body 26 closest to the mounting surface 60 is spaced from the mounting surface 60 with a predetermined distance.

Figure 1B:
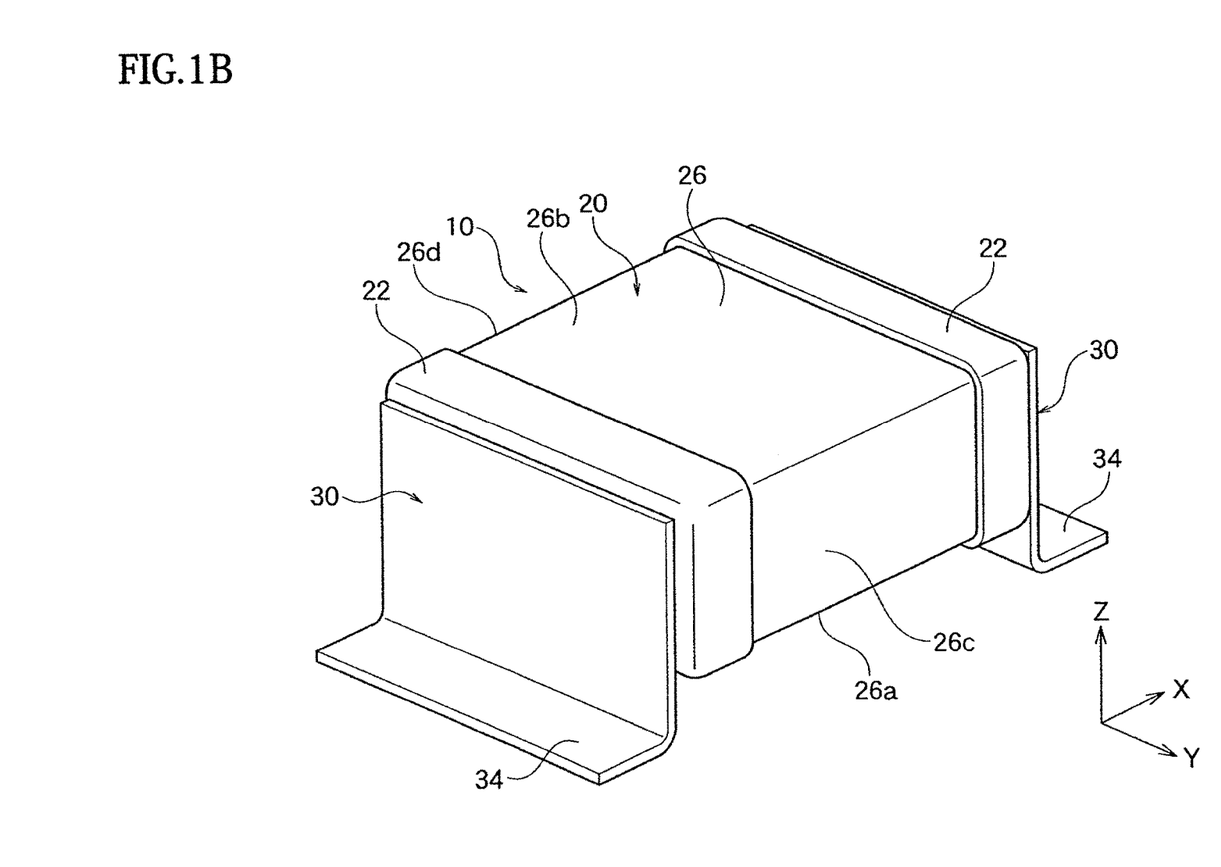
FIG. 1B is a schematically cross sectional view of a main part of an electronic device according to further another embodiment of the present invention.

The link part 36 has a bent shape bending from the terminal electrode connection part 32 to the direction of the bottom side surface 26a (inside) so that the mounting connection part 34 opposes to the bottom side surface 26a with a predetermined distance. As shown in FIG. 1B, however, the mounting connection part 34 may be bent from the terminal electrode connection part 32 to the opposite direction of the bottom side surface 26a (outside) as a variation of the present embodiment.

As shown in FIG. 2, the metal terminals 30 are respectively constituted by a clad material having a three-layer multilayer structure of a first metal 30a connected to the end surface electrode parts 22a via a solder 50, a second metal 30b arranged outside the first metal 30a, and a third metal 30c arranged outside the second metal 30b. In the present embodiment, thermal expansion coefficients of the first metal 30a and the third metal 30c are larger than that of the ceramic element body 26.

The difference between the thermal expansion coefficients of the first metal 30a and the third metal 30c and the thermal expansion coefficient of the ceramic element body 26 is preferably 0.5 ppm or more, more preferably 1 ppm or more, and particularly preferably 2 ppm or more. The thermal expansion coefficient of the ceramic element body 26 is normally (6 to 14)×10-6/K, though it depends upon the material of the dielectric layers 2. The first metal 30a and the third metal 30c are preferably constituted by the same metal, but may be constitute by different metals. In any case, the thermal expansion coefficient of the metal terminal 30 constituted by the three-layer structure of the first metal 30a, the second metal 30b, and the third metal 30c is smaller than that of the ceramic element body 26.

The first metal 30a and the third metal 30c are preferably nonferrous metals such as copper, copper alloy, aluminum, aluminum alloy, zinc, and zinc alloy, for example.

Instead, the first metal 30a and the third metal 30c are a metal having a smaller electric resistance than that of the second metal 30b, such as copper, copper alloy, aluminum, aluminum alloy, zinc, and zinc alloy, for example. The difference between the electric resistances of the first metal 30a and the third metal 30c and the electric resistance of the second metal 30b is preferably 3×10-8 Ω·m or more. Incidentally, the electric resistance of the second metal 30b is preferably (5 to 100)×10-8 Ω·m in terms of volume resistivity.

In the present embodiment, the thermal expansion coefficient of the second metal 30b is smaller than that of the ceramic element body 26. The difference between the thermal expansion coefficient of the second metal 30b and the thermal expansion coefficient of the ceramic element body 26 is preferably 0.5 ppm or more, more preferably 1 ppm or more, and particularly preferably 2 ppm or more.

The second metal 30b having a smaller thermal expansion coefficient than that of the ceramic element body 26 is preferably, for example, an iron based alloy of 42Ni—Fe, 36Ni—Fe, 52Ni—Fe, 50Ni—Fe, 30Ni—Fe, 32Ni-5Co—Fe, 29Ni-16Co—Fe, or the like. The second metal 30b is not limited to an iron based metal as long as the second metal 30b has a smaller thermal expansion coefficient than that of the ceramic element body 26, and may be SUS410, SUS430, Ni or the like.

As a preferable combination, the first metal 30a is copper or a copper alloy, the second metal 30b is 42Ni—Fe or 36Ni—Fe, and the third metal 30c is copper or a copper alloy. A total thickness t0 of the metal terminal 30 consisting of a three-layer multilayer structure of the first metal 30a, the second metal 30b, and the third metal 30c is not limited, but is preferably 0.1 to 0.2 mm.

A thickness t1 of the first metal 30a is preferably 10 μm or more at minimum. The maximum value of the thickness t1 of the first metal 30a is determined by balance with the total thickness t0, and is determined so that t1/t0 is preferably ½ or less. A thickness t2 of the second metal 30b is preferably 20 μm or more at minimum. The maximum value of the thickness t2 of the second metal 30b is determined by balance with the total thickness t0, and is determined so that t2/t0 is preferably 9/10 or less, more preferably 8/10 or less. That is, t2/t0 is preferably 90% or less and more preferably 80% or less in terms of the constitution ratio of the second metal 30b.

Furthermore, a thickness t3 of the third metal 30c is preferably 10 μm or more at minimum. The maximum value of the thickness t3 of the third metal 30c is determined by balance with the total thickness t0, and is determined so that t3/t0 is preferably ½ or less. The thickness t3 of the third metal 30c may be the same as or different from the thickness t1 of the first metal 30a, but a total thickness of (t1+t3) is preferably configured to be 60% or less of the total thickness t0. The total thickness of (t1+t3) is preferably 40% or more, and more preferably 50% or more in terms of the constitution ratio of the second metal 30b.

That is, the constitution ratio (t2/t0) of the second metal 30b in the external terminal 30 is preferably 40% or more and is more preferably 50% or more, and the upper limit of the constitution ratio (t2/t0) is preferably 90% or less and is more preferably 80% or less. The sum of the constitution ratios of the first metal 30a and the third metal 30c ((t1+t3)/t0) is preferably 60% or less of the whole, and is more preferably 50% or less of the whole. Incidentally, when a volume resistivity of the first metal 30a connected to the terminal electrode 22 is higher than that of the second metal 30b, the thickness t1 is preferably smaller than the thickness t2 and may be smaller than the thickness t3.

The thicknesses t0 to t3 configured in the above manner increase an effect of reducing a stress at a connection part of the external terminal (for example, at a connection part by the solder 50) and also improve the effect of ESR.

The shape and size of the chip capacitor 20 are appropriately determined depending upon object and usage. When the chip capacitor 20 has a rectangular parallelepiped shape, the size of the chip capacitor 20 is normally approximately length (0.6 to 7.5 mm)×width (0.3 to 6.3 mm)×thickness (0.1 to 3.2 mm).

Manufacturing Method of Electronic Device 10

Hereinafter, a manufacturing method of the electronic device 10 will be described. First, the chip capacitor 20 is manufactured. A green sheet paint is prepared so as to form a green sheet to be a dielectric layer after being fired. In the present embodiment, the green sheet paint is composed of an organic solvent based paste obtained by kneading a raw material of a dielectric material and an organic vehicle, or is composed of an aqueous paste.

The raw material of the dielectric material is various kinds of compounds to be calcium titanate, strontium titanate, or barium titanate after being fired appropriately selected from carbonate, nitrate, hydroxide, organic metal compound, or the like, and these may be mixed and used.

Next, the above-mentioned green sheet paste is used so as to form a green sheet on a carrier sheet. Next, an electrode pattern to be an internal electrode layer after being fired is formed on one of the surfaces of the green sheet. The electrode pattern is formed by any method, such as a printing method, a transfer method, and a thin film method. After the electrode pattern is formed on the green sheet, a green sheet with the electrode pattern is obtained by drying the electrode pattern.

A conductor material used for manufacturing an internal electrode layer paste is preferably Ni, a Ni alloy, or a mixture of these. The conductor material has any shape, such as spherical shape and scale shape, and may have a shape where these shapes are mixed.

Next, the green sheet with the internal electrode pattern is peeled from the carrier sheet and laminated to a desired lamination number so as to obtain a green laminated body. Incidentally, an external layer green sheet with no internal electrode pattern is laminated at the first and last laminations.

Thereafter, the green laminated body is finally pressurized and is polished as necessary for a debinding treatment. Then, a green chip is fired under any conditions. The green chip is subjected to an annealing treatment, polishing, and the like as necessary after being fired so as to obtain the capacitor element body 26 shown in FIG. 1A.

Thereafter, the terminal electrodes 22 are formed on the capacitor element body 26. For example, the terminal electrode 22 is manufactured in a manner that a terminal electrode paste is baked to form a base electrode, and that a metal coating film is formed on the surface of the base electrode by plating. Incidentally, the terminal electrode paste can be prepared in the same manner as the above-mentioned internal electrode layer paste.

When the terminal electrode 22 having a resin electrode layer is formed, for example, the base electrode consisting of a baked layer is formed on the end surface of the element body 26, and a resin electrode paste film is thereafter applied thereto, whereby the resin electrode layer is formed. After this, a Ni plating layer and a Sn plating layer are formed.

In the manufacture of the metal terminals 30, a planar three-layer multilayer clad metal plate material is firstly prepared. Next, the metal plate material is mechanically machined so as to obtain the metal terminals 30 shown in FIG. 1A and FIG. 2. The metal plate material is machined by any method, but is preferably machined by pressing. A metal coating film by plating may be formed on the surfaces of the metal terminals 30.

The material used for the plating is not limited, but Ni, Cu, Sn etc. is used, for example. The thickness of the metal coating film by plating is preferably one third or less of the thickness of the first metal 30a.

The terminal electrode connection parts 32 of the metal terminals 30 are connected to the end surface electrode parts 22a of the terminal electrodes 22 formed on both end surfaces in the X-axis direction of the chip capacitor 20 obtained in the above manner. As shown in FIG. 2, these are connected by the solders 50 in the present embodiment.

In the present embodiment, the thermal expansion coefficient of the metal terminal 30 with the three-layer multi-layer structure is smaller than that of the ceramic element body 26. In the present embodiment, a stress at a connection part of the metal terminal 30 (for example, the connection part by the solder 50) can be thus reduced. The reduction of the stress improves the strength at the connection part between the terminal electrode 22 of the ceramic element body 26 and the metal terminal 30, and also improves reliability such as thermal shock resistance.

In the present embodiment, the thermal expansion coefficients of the first metal 30a and the third metal 30c are larger than that of the ceramic element body 26. The first metal 30a and the third metal 30c having a larger thermal expansion efficient than that of the ceramic element body 26 normally have a low electric resistance and can improve an equivalent series resistance (ESR) of the electric component 10. In particular, the equivalent series resistance (ESR) of the electric component 10 can be improved by using a metal with a low electric resistance, such as copper and copper alloy.

In the present embodiment, the constitution ratio of the first metal 30a, the second metal 30b, and the third metal 30c is configured to be in a specific range. This configuration improves the reduction effect of the stress at a connection part of the metal terminal 30 (for example, the connection part by the solder 50) and also improves the effect of the ESR.

Furthermore, in the present embodiment, the metal terminals 30 are constituted by a clad material of the three-layer structure, and thus are preferable as they have less warpage due to temperature change than a two-layer clad material. In the present embodiment, a low resistance metal with a comparatively low resistance, such as copper based metal, is used as the first metal 30a and the second metal 30c arranged on both sides, and the reduction effect of the ESR is large particularly for the purpose of high frequency. This is probably because a high frequency current easily flows near the surface of the metal terminal 30.

Second Embodiment

Figure 3:
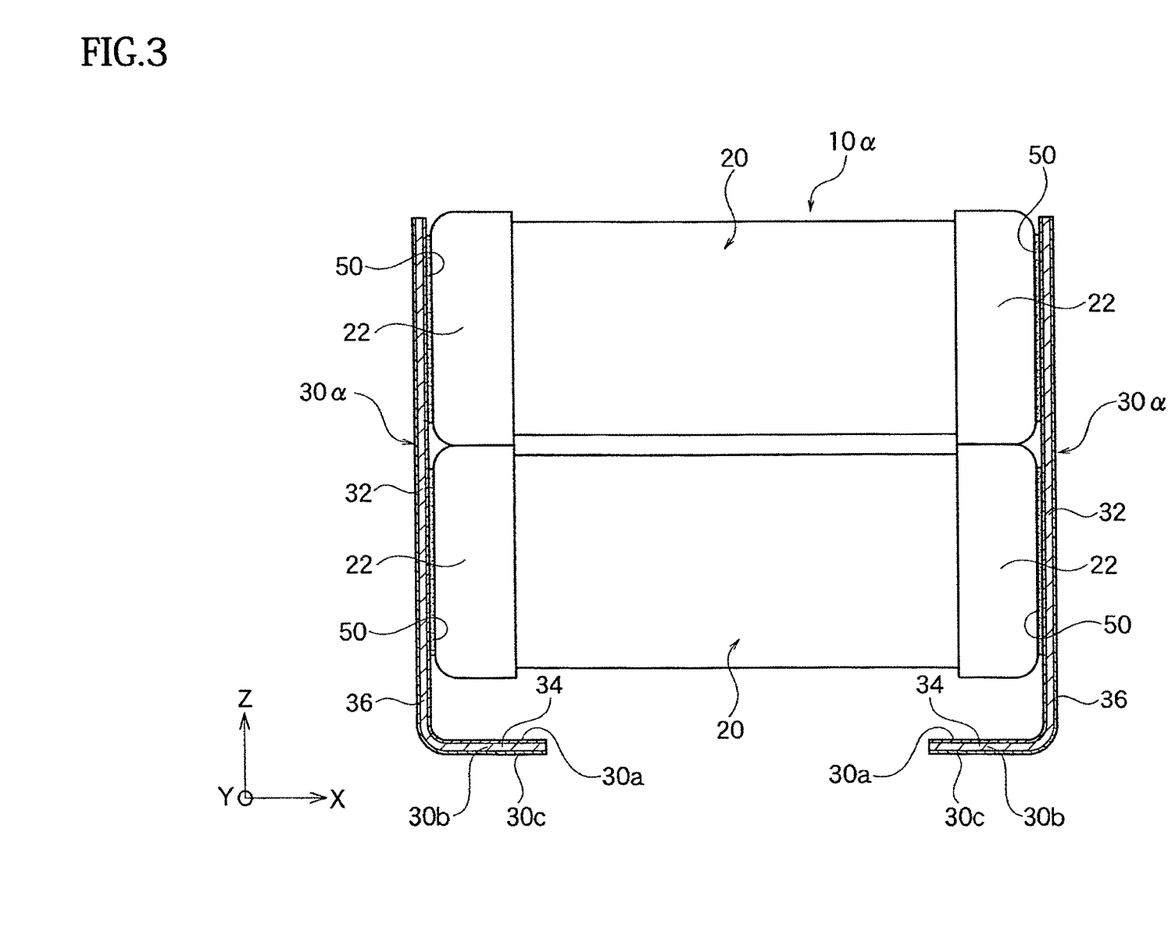
FIG. 3 is a schematically cross sectional view of a main part of an electronic device according to another embodiment of the present invention.

FIG. 3 is a perspective view of an electronic device 10α according to Second Embodiment of the present invention. The electronic device 10α has the same structure and demonstrates the same effect as the electronic device 10 according to First Embodiment shown in FIG. 1A and FIG. 2 except for the following matters, and common parts are provided with common member codes and are not described.

As shown in FIG. 3, in the present embodiment, metal terminals 30α arranged on both ends in the X-axis direction are high in the Z-axis direction, and two or more terminal electrodes 22 of chip capacitors 20 arranged in parallel in the Z-axis direction are respectively connected to terminal electrode connection parts 32 via solders 50. Incidentally, FIG. 3 shows that the solders 50 are discontinuous between the respective terminal electrodes 22 in the Z-axis direction, but may be formed continuously.

The electronic device 10α of the present embodiment has the same structure and demonstrates the same effect as the electronic device 10 of First Embodiment except that the chip capacitors 20 are arranged in parallel in the Z-axis direction.

Third Embodiment

Figure 4:
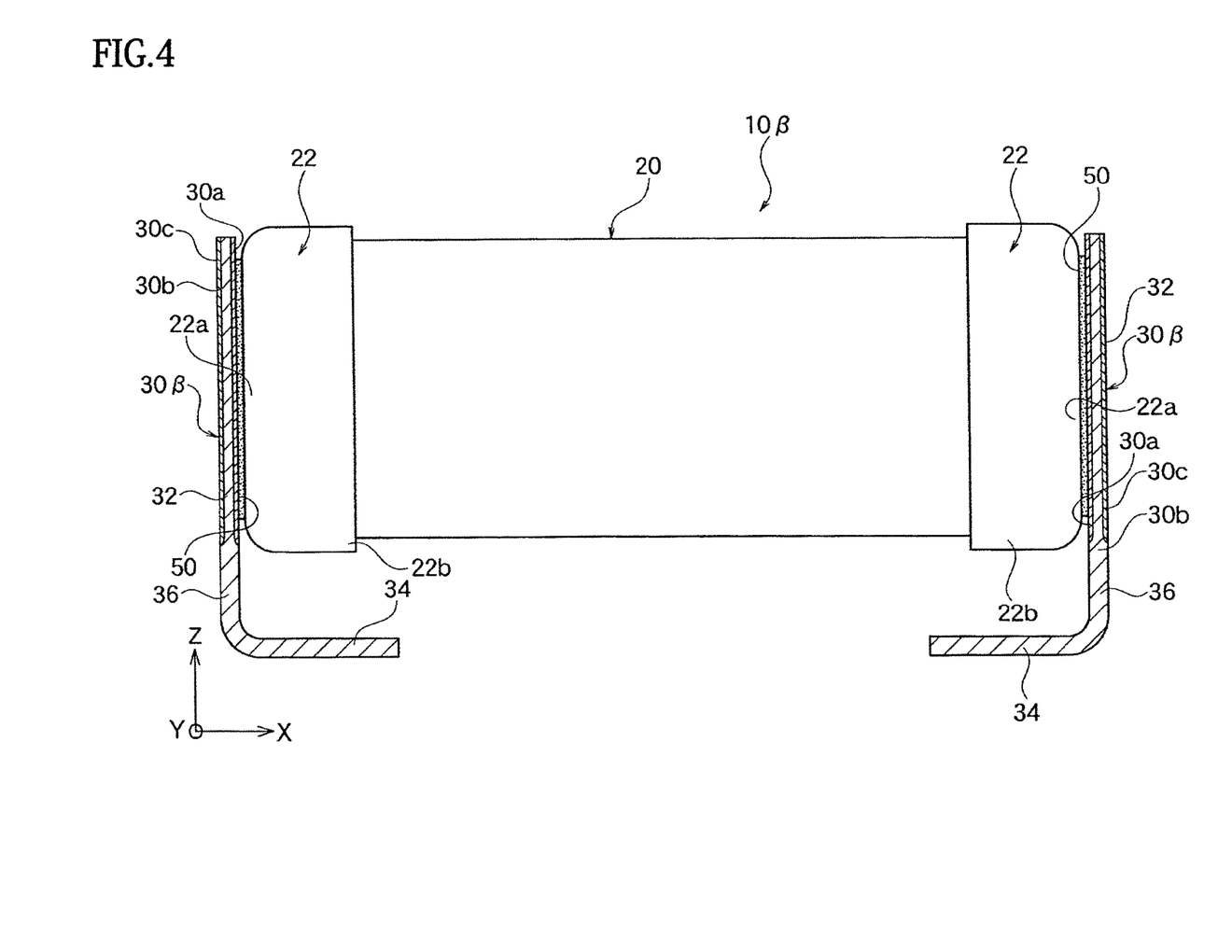
FIG. 4 is a schematically cross sectional view of a main part of an electronic device according to further another embodiment of the present invention.

FIG. 4 is a perspective view of an electronic device 10β according to Third Embodiment of the present invention.

The electronic device 10β has the same structure and demonstrates the same effect as the embodiments shown in FIG. 1A to FIG. 3 except for the following matters, and common parts are provided with common member codes and are not described.

As shown in FIG. 4, in the present embodiment, only a part of a metal terminal 30β corresponding to the terminal electrode connection part 32 is constituted by a three-layer multilayer clad consisting of the first metal 30a, the second metal 30b, and the third metal 30c, and the mounting connection part 34 and the link part 36 are constituted by only the second metal 30b. When the second metal 30b is constituted by a metal material having a small electric resistance, a volume of the second metal 30b is increased, and it is thus expected that the ESR improves, and that the effect of stress reduction at the connection part by the solder 50 is demonstrated.

The other structures are the same as First Embodiment or Second Embodiment, and the same effects are demonstrated.

Fourth Embodiment

Figure 5:
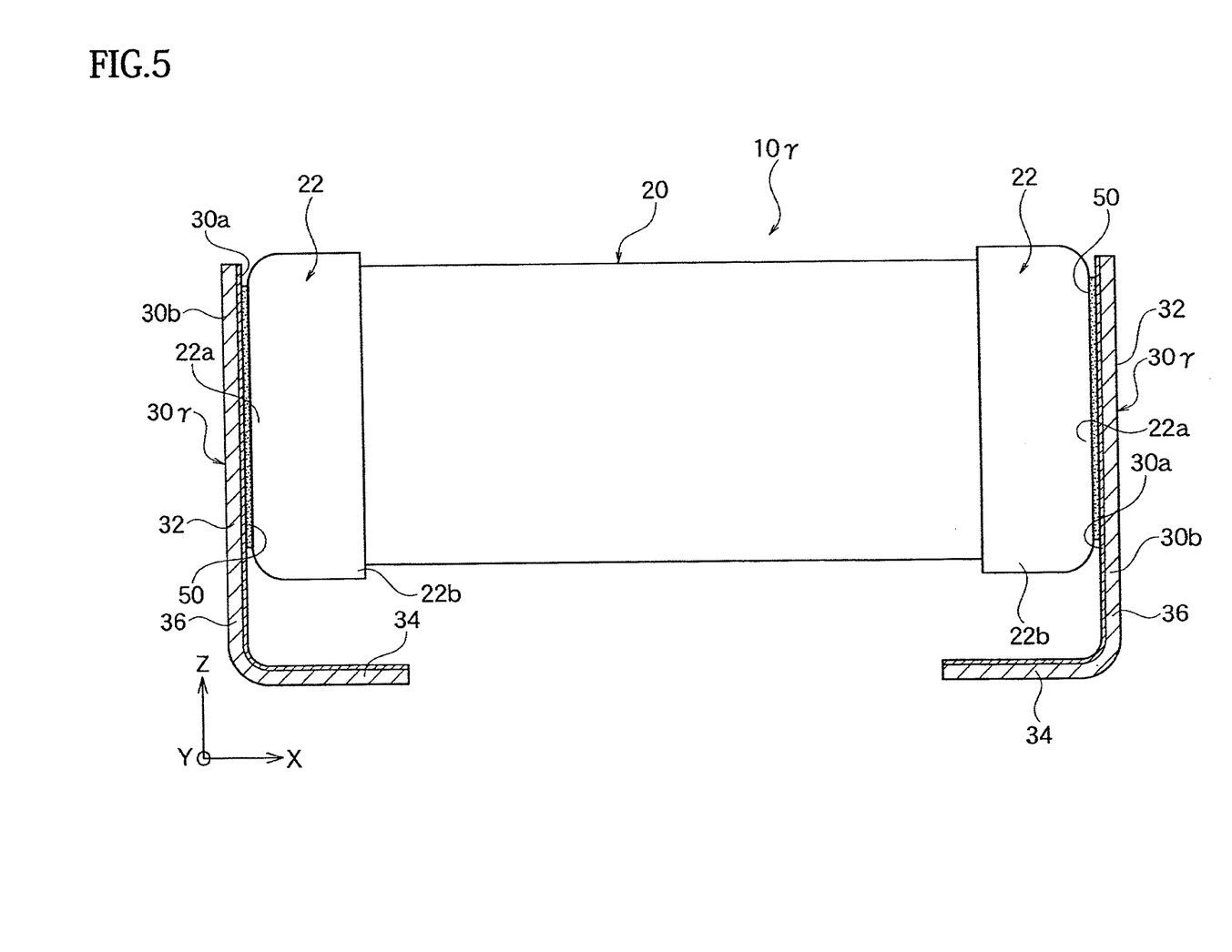
FIG. 5 is a perspective view of an electronic device according to further another embodiment of the present invention.

FIG. 5 is a perspective view of an electronic device 10γ according to Fourth Embodiment of the present invention. The electronic device 10γ has the same structure and demonstrates the same effect as the embodiments shown in FIG. 1A to FIG. 4 except for the following matters, and common parts are provided with common member codes and are not described.

As shown in FIG. 5, in the present embodiment, a metal terminal 30γ is constituted by a two-layer multilayer clad consisting of a first metal 30a and a second metal 30b. The thermal expansion coefficient of the metal terminal 30γ is smaller than that of a ceramic element body 26. The first metal 30a of the present embodiment is constituted by the same material as the first metal 30a mentioned in the above embodiments, and the second metal 30b of the present embodiment is constituted by the same material as the second metal 30b mentioned in the above embodiments.

As a preferable combination, the first metal 30a is copper or a copper alloy, and the second metal 30b is 42Ni—Fe or 36Ni—Fe. A total thickness t0 of the metal terminal 30γ consisting of the two-layer multilayer structure of the first metal 30a and the second metal 30b is not limited, but is preferably 0.1 to 0.2 mm.

A thickness t1 of the first metal 30a is preferably 10 μm or more at minimum. The maximum value of the thickness t1 of the first metal 30a is determined by balance with the total thickness t0, and is determined so that t1/t0 is preferably ½ or less. The maximum value of a thickness t2 of the second metal 30b is determined by balance with the total thickness t0, and is determined so that t2/t0 is preferably 9.5/10 or less, and t2/t0 is more preferably 9/10 or less. That is, t2/t0 is preferably 95% or less and more preferably 90% or less in terms of the constitution ratio of the second metal 30b.

The constitution ratio (t2/t0) of the second metal 30b in the external terminal 30 is preferably 40% or more and is more preferably 50% or more, and the upper limit of the constitution ratio (t2/t0) is preferably 95% or less and is more preferably 90% or less. When a volume resistivity of the first metal 30a connected to the terminal electrode 22 is higher than that of the second metal 30b, the thickness t1 is preferably smaller than the thickness t2.

The thicknesses t0 to t3 configured in the above manner increase the effect of reducing a stress at a connection part of the external terminal (for example, at the connection part by the solder 50) and also improves the effect of ESR.

The other structures are the same as First Embodiment or Second Embodiment, and the same effects are demonstrated.

Other Embodiments

Incidentally, the present invention is not limited to above-mentioned embodiments, and can be variously changed within the scope of the present invention. For example, the terminal electrode 22 and the metal terminals 30, 30α, 30β, and 30γ are connected using the solder 50 in the above-mentioned embodiments, but may be connected by a conductive adhesive or another connection means.

In the above-mentioned embodiments, the second metal 30b is constituted by a metal having a smaller thermal expansion coefficient than that of the ceramic element body 26, and the first metal 30a and the third metal 30c are constituted by a metal having a larger thermal expansion coefficient than that of the ceramic element body 26 (or a low resistance metal), but the opposite may be employed. That is, the second metal 30b is constituted by a metal having a larger thermal expansion coefficient than that of the ceramic element body 26 (or a low resistance metal), and the first metal 30a and the third metal 30c are constituted by a metal having a smaller thermal expansion coefficient than that of the ceramic element body 26.

In this case, however, the constitution ratio of the second metal 30b in the external terminal 30 (t2/t0) is preferably 50% or less, more preferably 40% or less. This constitution ratio (t2/t0) is not limited to a specific lower limit, but is preferably 5% or more, more preferably 10% or more. In this case, it is expected that the second metal 30b is constituted by a metal having a lower electric resistance than that of the first metal 30a and the third metal 30c.

When the second metal 30b is constituted by a metal having a larger thermal expansion coefficient than that of the ceramic element body 26 (or a low resistance metal) in the embodiment shown in FIG. 4, the volume of the second metal 30b increases, and thus the ESR is particularly expected to be improved. Incidentally, the second metal 30b constitutes the link part 36 and the mounting connection part 34 in Third Embodiment shown in FIG. 4, but the first metal 30a or the third metal 30c constituting the terminal electrode connection part 32 may continuously constitute the link part 36 and the mounting connection part 34. When the first metal 30a or the third metal 30c has a lower resistance than the second metal 30b, it is advantageous for reduction in the ESR.

EXAMPLES

Hereinafter, the present invention will be described based on more detailed examples, but is not limited thereto.

Example 1

A ceramic element body 26 shown in FIG. 1A and FIG. 2 was prepared, and terminal electrodes 22 were formed on both end surfaces of the ceramic element body 26. The ceramic element body 26 had a size of length 5.7 mm, width 5.0 mm, and height 2.3 mm. An external terminal (metal terminal) 30 consisting of a clad material having a three-layer multilayer structure of a first metal 30a, a second metal 30b, and a third metal 30c was prepared, and the first metal 30a was connected to the terminal electrode 22 using a solder 50. Then, a sample of Example 1 was manufactured.

In the external terminal 30, the first metal 30a was copper, the second metal 30b was a 36NiFe alloy, and the third metal 30c was copper. Incidentally, Table 1 shows thicknesses t1, t2, and t3 of the respective metals 30a, 30b, and 30c, a total thickness t0, and a constitution ratio (t2/t0) of the second metal 30b in the external terminal 30.

As a result of measurement of thermal expansion coefficients of the external terminal 30 and the ceramic element body 26 based on the following bases, the thermal expansion coefficient of the external terminal 30 was $5.5 \times 10^{-6}$/K, and the thermal expansion coefficient of the ceramic element body 26 was $11.4 \times 10^{-6}$/K. Incidentally, a thermal expansion coefficient of the first metal 30a by itself was larger than that of the ceramic element body 26, a thermal expansion coefficient of the second metal 30b by itself was smaller than that of the ceramic element body, and a thermal expansion coefficient of the third metal 30c by itself was larger than that of the ceramic element body 26.

A. Thermal Expansion Coefficient of External Terminal 30

The external terminal 30 of the sample according to the present example was cut into a prism of length 5 mm, width 5 mm, and height 0.1 mm so as to prepare a test piece, and this test piece was subjected to a thermomechanical analysis (TMA) so as to measure a thermal expansion coefficient. In the TMA, the test piece was held in a nitrogen atmosphere in a temperature range of 25 to 200° C. so that the length direction was vertical, the length variation was measured, and the thermal expansion coefficient of the ceramic element body 26 was calculated from a rate of change calculated based on the measurement result.

B. Thermal Expansion Coefficient of Ceramic Element Body 26

The ceramic element body 26 of a sample according to the present example was subjected to the TMA while the terminal electrodes 22 were attached so as to measure the thermal expansion coefficient. In the TMA, the test piece was held in a nitrogen atmosphere in a temperature range of 25 to 200° C. so that the height direction was vertical, the height variation was measured, and the thermal expansion coefficient of the ceramic element body 26 was calculated from a rate of change calculated based on the measurement result. Incidentally, ($\times 10^{-6}$/K) is not written in the values of thermal expansion coefficient in Tables.

In each sample, (1) thermal shock resistance, (2) fixing strength, (3) ESR, and (4) temperature change ΔT were measured in the following manner.

(1) Thermal Shock Resistance

Each sample was subjected to a thermal shock test so as to evaluate a thermal shock resistance. In the thermal shock test, each sample mounted on a circuit board was subjected to one thermal processing cycle consisting of the following steps (i) to (iv) 2000 times. Incidentally, the circuit board was a glass epoxy circuit (epoxy resin using glass fiber sheet as its core material).

In the step (i), each sample was held for 30 minutes in a temperature condition where each sample had a temperature of −55° C.

In the step (ii), the temperature of each sample was increased to 125° C. within 10% (three minutes) of the holding time.

In the step (iii), each sample was held for 30 minutes in a temperature condition where each sample had a temperature of 125° C.

In the step (iv), the temperature of each sample was decreased to −55° C. within 10% (three minutes) of the holding time.

After the thermal shock test, the presence of cracks on the ceramic element bodies 26 of each sample was determined based on its appearance, and the thermal shock resistance was evaluated based on the determination results. In the evaluation for 200 samples, a sample where 10 or more cracks were observed was determined as NG, and a sample where 5 or less cracks were observed was determined as G. The results are shown in Table 1 and Table 3.

(2) Fixing Strength

Each sample was subjected to a fixing strength test so as to measure a fixing strength. In the fixing strength test, each sample mounted on a circuit board was pressed by a hard pressurizing jig (e.g. bar-shaped jig) moving toward a side surface of the sample at 30 mm/min. During this time, an external force immediately before the external terminal 30 was deformed was measured as a fixing strength. The results are shown in Table 1 and Table 3.

(3) ESR

The ESRs were measured in a state where the external terminals 30 of each sample were soldered on a mounting substrate. Each sample of the ESRs was arranged so that longer sides of a rectangle constituting a chip end surface were horizontal to the mounting surface. An impedance analyzer was used for the measurement of the ESRs. The results are shown in Table 2 and Table 4.

(4) Temperature Change ΔT

An AC current was applied to each sample so as to measure a temperature increase ΔT by self-heating of each sample due to the ESR. The results are shown in Table 2 and Table 4.

Example 2

Samples were prepared and measured in the same manner as Example 1 except that the thicknesses t1 to t3 of the first metal 30a to the third metal 30c constituting the external terminal 30 were changed to the values shown in Table 1 and Table 2, and that the thermal expansion coefficient of the external terminal 30 was changed. The results are shown in Table 1 and Table 2.

Example 3

Samples were prepared and measured in the same manner as Example 1 except that the thicknesses t1 to t3 of the first metal 30a to the third metal 30c constituting the external terminal 30 were changed to the values shown in Table 1 and Table 2, and that the thermal expansion coefficient of the external terminal 30 was changed. The results are shown in Table 1 and Table 2.

Comparative Example 1

Samples were prepared and measured in the same manner as Example 1 except that the thicknesses t1 to t3 of the first metal 30a to the third metal 30c constituting the external terminal 30 were changed to the values shown in Table 1 and Table 2, and that the thermal expansion coefficient of the external terminal 30 was changed. The results are shown in Table 1 and Table 2.

Example 4

Samples were prepared and measured in the same manner as Example 1 except that a ceramic element body 26 having a thermal expansion coefficient of $8.1 \times 10^{-6}$/K was used. The results are shown in Table 1.

Example 5

Samples were prepared and measured in the same manner as Example 2 except that a ceramic element body 26 having a thermal expansion coefficient of 8.1×10-6/K was used. The results are shown in Table 1.

Comparative Example 2

Samples were prepared and measured in the same manner as Example 3 except that a ceramic element body 26 having a thermal expansion coefficient of 8.1×10-6/K was used. The results are shown in Table 1.

Comparative Example 3

Samples were prepared and measured in the same manner as Comparative Example 1 except that a ceramic element body 26 having a thermal expansion coefficient of 8.1×10-6/K was used. The results are shown in Table 1.

Example 11

Samples of Example 11 were prepared and measured in the same manner as Example 1 except that the first metal 30a was a 36NiFe alloy, the second metal 30b was copper, the third metal 30c was a 36NiFe alloy, these metals had thicknesses shown in Table 3, and that an external terminal 30 having a thermal expansion coefficient of 6.6×10-6/K was used. The results are shown in Table 3 and Table 4.

Incidentally, a thermal expansion coefficient of the first metal 30a by itself was smaller than that of the ceramic element body 26, a thermal expansion coefficient of the second metal 30b by itself was larger than that of the ceramic element body 26, and a thermal expansion coefficient of the third metal 30c by itself was smaller than that of the ceramic element body 26.

Example 12

Samples were prepared and measured in the same manner as Example 11 except that the thicknesses t1 to t3 of the first metal 30a to the third metal 30c constituting the external terminal 30 were changed to the values shown in Table 3 and Table 4, and that the thermal expansion coefficient of the external terminal 30 was changed. The results are shown in Table 3 and Table 4.

Comparative Example 11

Samples were prepared and measured in the same manner as Example 11 except that the thicknesses t1 to t3 of the first metal 30a to the third metal 30c constituting the external terminal 30 were changed to the values shown in Table 3 and Table 4, and that the thermal expansion coefficient of the external terminal 30 was changed. The results are shown in Table 3 and Table 4.

Example 13

Samples of Example 13 were prepared in the same manner as Example 13 and measured in the same manner as Example 11 except that a ceramic element body 26 having a thermal expansion coefficient of 8.1×10-6/K was used. The results are shown in Table 3.

Comparative Example 12

Samples were prepared and measured in the same manner as Example 13 except that the thicknesses t1 to t3 of the first metal 30a to the third metal 30c were changed to the values shown in Table 3, and that the thermal expansion coefficient of the external terminal 30 was changed. The results are shown in Table 3.

Comparative Example 13

Samples were prepared and measured in the same manner as Example 13 except that the thicknesses t1 to t3 of the first metal 30a to the third metal 30c were changed to the values shown in Table 3, and that the thermal expansion coefficient of the external terminal 30 was changed. The results are shown in Table 3.

Evaluation

As shown in Table 1, it was confirmed from Example 1 to Example 5 that a favorable thermal shock resistance was obtained when the second metal was an iron based metal, and the total thermal expansion coefficient of the external terminal 30 was smaller than the thermal expansion coefficient of the ceramic element body 26, that is, when this difference of the thermal expansion coefficient was preferably 0.5 ppm or more, more preferably 1 ppm or more, and particularly preferably 2 ppm or more. It was also confirmed that a fixing strength higher than that of Comparative Example 1 was obtained in Example 1 to Example 3, a fixing strength higher than that of Comparative Example 2 and Comparative Example 3 was obtained in Example 4 and Example 5, and reliability was improved.

As shown in Table 1 and Table 2, it was confirmed from Examples that favorable thermal shock resistance and fixing strength were obtained while favorable ESRs and ΔT were secured.

As shown in Table 3, it was confirmed from Example 11 to Example 13 that a favorable thermal shock resistance was obtained when the second metal was a copper based metal, and the total thermal expansion coefficient of the external terminal 30 was smaller than the thermal expansion coefficient of the ceramic element body 26, that is, when this difference of the thermal expansion coefficient was preferably 0.5 ppm or more, more preferably 1 ppm or more, and particularly preferably 2 ppm or more. It was also confirmed that a fixing strength higher than that of Comparative Example 11 was obtained in Example 11 and Example 12, a fixing strength higher than that of Comparative Example 13 was obtained in Example 13, and reliability was improved.

As shown in Table 3 and Table 4, it was confirmed from Examples that favorable thermal shock resistance and fixing strength were obtained while ESRs and ΔT were secured.

TABLE 1

| No. | Thermal expansion coefficient of external terminal | Thermal expansion coefficient of ceramic element body | Difference in thermal expansion (ppm) | Thermal expansion | Fixing strength [N] | Thickness t1 of first metal (Cu) [mm] | Thickness t2 of second metal (36NiFe) [mm] | Thickness t3 of third metal (Cu) [mm] | Total thickness t0 [mm] | Constitution ratio of second metal (%) |
|---|---|---|---|---|---|---|---|---|---|---|
| Example 1 | 5.5 | 11.4 | 5.9 | G(0/200) | 235 | 0.01 | 0.08 | 0.01 | 0.1 | 80 |
| Example 2 | 8 | 11.4 | 3.4 | G(0/200) | 213 | 0.02 | 0.06 | 0.02 | 0.1 | 60 |
| Example 3 | 10.5 | 11.4 | 0.9 | G(3/200) | 199 | 0.03 | 0.04 | 0.03 | 0.1 | 40 |
| Comp. Ex. 1 | 14 | 11.4 | −2.6 | NG(30/200) | 160 | 0.04 | 0.02 | 0.04 | 0.1 | 20 |
| Example 4 | 5.5 | 8.1 | 2.6 | G(0/200) | 245 | 0.01 | 0.08 | 0.01 | 0.1 | 80 |
| Example 5 | 8 | 8.1 | 0.1 | G(5/200) | 220 | 0.02 | 0.06 | 0.02 | 0.1 | 60 |
| Comp. Ex. 2 | 10.5 | 8.1 | −2.4 | NG(20/200) | 215 | 0.03 | 0.04 | 0.03 | 0.1 | 40 |
| Comp. Ex. 3 | 14 | 8.1 | −5.9 | NG(80/200) | 190 | 0.04 | 0.02 | 0.04 | 0.1 | 20 |

TABLE 2

| No. | Thermal expansion coefficient of external terminal | Thermal expansion coefficient of ceramic element body | Difference in thermal expansion (ppm) | ESR [mohm] | ΔT [° C.] | Thickness t1 of first metal (Cu) [mm] | Thickness t2 of second metal (36NiFe) [mm] | Thickness t3 of third metal (Cu) [mm] | Total thickness t0 [mm] | Constitution ratio of second metal (%) |
|---|---|---|---|---|---|---|---|---|---|---|
| Example 1 | 5.5 | 11.4 | 5.9 | 4.2 | 13.3 | 0.01 | 0.08 | 0.01 | 0.1 | 80 |
| Example 2 | 8 | 11.4 | 3.4 | 3.1 | 9.4 | 0.02 | 0.06 | 0.02 | 0.1 | 60 |
| Example 3 | 10.5 | 11.4 | 0.9 | 2.8 | 9.2 | 0.03 | 0.04 | 0.03 | 0.1 | 40 |
| Comp. Ex. 1 | 14 | 11.4 | −2.6 | 2.6 | 9 | 0.04 | 0.02 | 0.04 | 0.1 | 20 |

TABLE 3

| No. | Thermal expansion coefficient of external terminal | Thermal expansion coefficient of ceramic element body | Difference in thermal expansion (ppm) | Thermal shock | Fixing strength [N] | Thickness t1 of first metal (36NiFe) [mm] | Thickness t2 of second metal (Cu) [mm] | Thickness t3 of third metal (36NiFe) [mm] | Total thickness t0 [mm] | Constitution ratio of second metal (%) |
|---|---|---|---|---|---|---|---|---|---|---|
| Example 11 | 6.6 | 11.4 | 4.8 | G(0/200) | 220 | 0.033 | 0.034 | 0.033 | 0.1 | 34 |
| Example 12 | 9 | 11.4 | 2.4 | G(0/200) | 208 | 0.025 | 0.05 | 0.025 | 0.1 | 50 |
| Comp. Ex. 11 | 12.1 | 11.4 | −0.7 | NG(10/200) | 191 | 0.016 | 0.067 | 0.016 | 0.1 | 67 |
| Example 13 | 6.6 | 8.1 | 1.5 | G(2/200) | 235 | 0.033 | 0.034 | 0.033 | 0.1 | 34 |
| Comp. Ex. 12 | 9 | 8.1 | −0.9 | NG(10/200) | 220 | 0.025 | 0.05 | 0.025 | 0.1 | 50 |
| Comp. Ex. 13 | 12.1 | 8.1 | −4.0 | NG(30/200) | 215 | 0.016 | 0.067 | 0.016 | 0.1 | 67 |

TABLE 4

| No. | Thermal expansion coefficient of external terminal | Thermal expansion coefficient of ceramic element body | Difference in thermal expansion (ppm) | ESR [mohm] | ΔT [° C.] | Thickness t1 of first metal (36NiFe) [mm] | Thickness t2 of second metal (Cu) [mm] | Thickness t3 of third metal (36NiFe) [mm] | Total thickness t0 [mm] | Constitution ratio of second metal (%) |
|---|---|---|---|---|---|---|---|---|---|---|
| Example 11 | 6.6 | 11.4 | 4.8 | 3.5 | 11.1 | 0.033 | 0.034 | 0.033 | 0.1 | 34 |
| Example 12 | 9 | 11.4 | 2.4 | 3 | 9.3 | 0.025 | 0.05 | 0.025 | 0.1 | 50 |
| Comp. Ex. 11 | 12.1 | 11.4 | −0.7 | 2.7 | 9.1 | 0.016 | 0.067 | 0.016 | 0.1 | 67 |

NUMERICAL REFERENCES

2 . . . dielectric layer
4 . . . internal electrode layer
10, 10α, 10β, 10γ . . . electronic device
20 . . . chip capacitor
22 . . . terminal electrode
22a . . . end surface electrode part
22b . . . side surface electrode part
26 . . . element body
26a . . . bottom side surface
26b . . . top side surface
26c . . . side surface
26d . . . side surface
30, 30α, 30β . . . metal terminal
30a . . . first metal
30b . . . second metal
30c . . . third metal
32 . . . terminal electrode connection part
34 . . . mounting connection part
36 . . . link part
50 . . . solder
60 . . . mounting surface

The invention claimed is:

1. An electronic device comprising:
a chip component with a terminal electrode formed on an end surface of a ceramic element body including an internal electrode; and
an external terminal electrically connected to the terminal electrode,
wherein the external terminal comprises:
a terminal electrode connection part arranged to face the terminal electrode; and
a mounting connection part connectable to a mounting surface,
the terminal electrode connection part comprises a multilayer structure of a first metal connected to the terminal electrode, a second metal arranged outside the first metal, and a third metal arranged outside the second metal,
a thermal expansion coefficient of the external terminal is smaller than that of the ceramic element body, and
the multilayer structure comprises a planar three-layer multilayer clad metal plate material.

2. An electronic device according to claim comprising:
a chip component with a terminal electrode formed on an end surface of a ceramic element body including an internal electrode; and
an external terminal electrically connected to the terminal electrode,
wherein the external terminal comprises:
a terminal electrode connection part arranged to face the terminal electrode; and
a mounting connection part connectable to a mounting surface,
the terminal electrode connection part comprises a multilayer structure of a first metal connected to the terminal electrode, a second metal arranged outside the first metal, and a third metal arranged outside the second metal,
a thermal expansion coefficient of the external terminal is smaller than that of the ceramic element body,
a thermal expansion coefficient of the first metal by itself is larger than that of the ceramic element body,
a thermal expansion coefficient of the second metal by itself is smaller than that of the ceramic element body, and
a thermal expansion coefficient of the third metal by itself is larger than that of the ceramic element body.

3. The electronic device according to claim 2, wherein a constitution ratio of the second metal in the external terminal is 40% or more.

4. An electronic device comprising:
a chip component with a terminal electrode formed on an end surface of a ceramic element body including an internal electrode; and
an external terminal electrically connected to the terminal electrode,
wherein the external terminal comprises:
a terminal electrode connection part arranged to face the terminal electrode; and
a mounting connection part connectable to a mounting surface,
the terminal electrode connection part comprises a multilayer structure of a first metal connected to the terminal electrode, a second metal arranged outside the first metal, and a third metal arranged outside the second metal,
a thermal expansion coefficient of the external terminal is smaller than that of the ceramic element body,
a thermal expansion coefficient of the first metal by itself is smaller than that of the ceramic element body,
a thermal expansion coefficient of the second metal by itself is larger than that of the ceramic element body, and
a thermal expansion coefficient of the third metal by itself is smaller than that of the ceramic element body.

5. The electronic device according to claim 4, wherein a constitution ratio of the second metal in the external terminal is 50% or less.

6. An electronic device comprising:
a chip component with a terminal electrode formed on an end surface of a ceramic element body including an internal electrode; and
an external terminal electrically connected to the terminal electrode,
wherein the external terminal comprises:
a terminal electrode connection part arranged to face the terminal electrode; and
a mounting connection part connectable to a mounting surface,
the terminal electrode connection part comprises a multilayer structure of a first metal connected to the terminal electrode and a second metal arranged outside the first metal,
a thermal expansion coefficient of the external terminal is smaller than that of the ceramic element body,
a thickness of the first metal is 10 µm or more,
the thickness of the first metal is smaller than that of the second metal,
a constitution ratio of the second metal in the external terminal is 40% or more,
a thermal expansion coefficient of the first metal by itself is larger than that of the ceramic element body, and
a thermal expansion coefficient of the second metal by itself is smaller than that of the ceramic element body.

7. The electronic device according to claim 1, wherein a metal coating film by plating is formed on surfaces of the external terminal.

* * * * *